United States Patent
Kaburagi et al.

(10) Patent No.: US 6,778,262 B2
(45) Date of Patent: Aug. 17, 2004

(54) FILM CONVEYING APPARATUS

(75) Inventors: Mitsuo Kaburagi, Hachioji (JP);
Mamoru Umeki, Hachioji (JP);
Hiroshi Namekawa, Kawagoe (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/447,155

(22) Filed: May 29, 2003

(65) Prior Publication Data

US 2003/0223052 A1 Dec. 4, 2003

(30) Foreign Application Priority Data

Jun. 3, 2002 (JP) ........................................ 2002-161243

(51) Int. Cl.$^7$ ........................ G03B 27/00; G03B 29/00; G03B 27/58; B65H 1/00; B65H 1/08

(52) U.S. Cl. ........................... 355/405; 355/28; 355/72; 271/145; 271/147

(58) Field of Search ................................. 355/405, 407, 355/408, 72, 28; 271/145, 147, 162, 163; 378/182; 396/34, 612

(56) References Cited

U.S. PATENT DOCUMENTS 6,172,735 B1 * 1/2001 Camillus et al. ............... 355/28

* cited by examiner

*Primary Examiner*—Peter B. Kim
(74) *Attorney, Agent, or Firm*—Finnegan, Henderson, Farabow, Garrett & Dunner, L.L.P.

(57) ABSTRACT

There is described a film conveying apparatus drawably mounted onto an image-forming apparatus. The apparatus includes a film stacking section to stack photosensitive films on it, a conveying device being movable between a film conveying position and a film supplying position to convey the photosensitive films one by one from uppermost one, a first shading member that encloses both the film stacking section and the conveying device and has a conveyance opening from which the photosensitive film is conveyed out by the conveying device so as to maintain a light-shading state for both the film stacking section and the conveying device when the conveying device parks at the film conveying position; a second shading member, being movable relative to the first shading member, to open and close the conveyance opening; and a shading-member moving device to move the second shading member so as to open and close the conveyance opening.

6 Claims, 4 Drawing Sheets

FILM CONVEYING APPARATUS

BACKGROUND OF THE INVENTION

This invention relates to a film conveying apparatus for conveying a film provided with a photosensitive layer composed of a thermally developable photosensitive material for example.

It has been known a system wherein after the information of an image photographed by means of an X-ray radiographing apparatus such as a CT apparatus or an image photographing apparatus for medical use such as an MRI apparatus is subjected to image processing operations such as a gradation processing, the image data are sent to an image recording apparatus such as a laser imager, and the image is recorded on a film provided with a photosensitive layer composed of thermally developable photosensitive material for example through the scanning by a laser beam which is driven and controlled in accordance with said image data.

An image recording apparatus as described in the above is equipped with a film cartridge capable of being mounted and dismounted for feeding a film to a recording section; a stack of plural sheets of film loaded in this film cartridge are fed one by one by means of a film conveying apparatus of the image recording apparatus mainframe to carry these film sheets to the recording section.

As an example of the conventional film conveying apparatus, there has been set forth in Tokkaihei 07-225452, a type in which the films are loaded onto the film cartridge by manually drawing the barrier sack toward the outside of the film cartridge after putting the barrier sack containing the stack of plural films on the film cartridge.

Further, there has been set forth in Tokkouhei 07-17280, another type in which the films are loaded onto the film cartridge by rolling the barrier sack onto a reel in the film cartridge after putting the barrier sack containing the stack of plural films on the film cartridge. In this type, when all of the films loaded on the film cartridge are consumed, the barrier sack rolled up in the film cartridge is removed so as to load new barrier sack containing the stack of new plural films.

In the film cartridge for any type, there is provided a shading plate for covering film sheets inside so as not to expose them to light when the cartridge has been taken out from the image recording apparatus. While the film is carried, that is, after the film cartridge is attached to the image recording apparatus mainframe, this shading plate is opened for carrying the film to the image recording apparatus mainframe, to secure the conveyance path to the film conveying apparatus. When the conveyance path is secured, the film conveying apparatus drives a suction cup for carrying film sheets loaded in the film cartridge one by one, to carry film sheets to the recording section.

In carrying film sheets, when film sheets in the cartridge have run out, the film cartridge is taken out of the image recording apparatus mainframe, the shading plate is opened, and film sheets are supplied from the opening.

Incidentally, during the conveyance of film sheets, when a film sheet is jammed in the film conveying apparatus, in order to solve this jamming (to make the jam processing), it is required to close the shading plate and dismount the film cartridge while the shading for the remaining film sheets in the cartridge is kept enough. However, when the shading plate is closed, there is a possibility that a film sheet creased due to the jamming remains inside the film cartridge, and although the film cartridge is again mounted after the jam processing in the film conveying apparatus, a proper conveyance cannot be carried out owing to the creased film sheet. Further, if the shading plate is opened for removing the creased film sheet from the film cartridge, the inside of the film cartridge is exposed to light, which makes the remaining normal film sheets exposed to light, and the film sheets become useless.

Furthermore, because the film conveying apparatus is disposed in the image recording apparatus mainframe, if a film sheet is jammed in this film conveying apparatus, it is required to carry out the operation in the mainframe part of the image recording apparatus after the film cartridge is taken out, which makes the jam processing difficult.

SUMMARY OF THE INVENTION

To overcome the abovementioned drawbacks in conventional film conveying apparatus, it is an object of the present invention to provide a film conveying apparatus, which makes it possible to easily conduct the jam processing while maintaining the light-shading capability for the photosensitive film.

Accordingly, to overcome the cited shortcomings, the abovementioned object of the present invention can be attained by film conveying apparatus described as follow.

(1) A film conveying apparatus, which is drawably mounted onto a main frame of an image-forming apparatus, for conveying a photosensitive film into the image-forming apparatus, the film conveying apparatus comprising: a film stacking section (hereinafter, also referred to as film containing means) to stack a plurality of photosensitive films on it; a conveying device to convey the plurality of photosensitive films, stacked on the film stacking section, one by one from uppermost one, the conveying device being movable between at least two positions of a film conveying position at which the photosensitive film is conveyed into the image-forming apparatus and a film supplying position at which the plurality of photosensitive films are supplied onto the film stacking section; a first shading member that encloses both the film stacking section and the conveying device, and that has a conveyance opening from which the photosensitive film is conveyed out by the conveying device so as to maintain a light-shading state for both the film stacking section and the conveying device when said conveying device parks at said film conveying position; a second shading member, being movable relative to the first shading member, to open and close the conveyance opening; and a shading-member moving device (hereinafter, also referred to as shading-piece opening/closing means) to move the second shading member so as to open and close the conveyance opening.

(2) The film conveying apparatus of item 1, further comprising: a shutter member to shade an end-seal portion of a barrier sack, in which the plurality of photosensitive films are packed, when the barrier sack is stored in the film stacking section to break the end-seal portion of the barrier sack; and a shutter-member driving device to drive the shutter member so as to shade the end-seal portion of the barrier sack while the conveying device moves from the film supplying position to the film conveying position.

(3) The film conveying apparatus of item 1, wherein the first shading member is drawable from the main frame of the image-forming apparatus, when the shading-member moving device moves the second shading member so as to close the conveyance opening.

(4) The film conveying apparatus of item 1, wherein the shading-member moving device moves the second shading member so as to open the conveyance opening, after the conveying device moves to the film conveying position.

(5) The film conveying apparatus of item 1, wherein, when the shading-member moving device moves the second shading member so as to close the conveyance opening, the second shading member is driven by an urging force for moving the second shading member into a closing state.

(6) The film conveying apparatus of item 1, wherein the first shading member also has an installation opening from which a barrier sack, in which the plurality of photosensitive films are packed, is installed on the film stacking section; and the film conveying apparatus further comprising: a third shading member, being manually movable relative to the first shading member, to open and close the installation opening.

Further, to overcome the abovementioned problems, other film conveying apparatus, embodied in the present invention, will be described as follow:

(7) A film conveying apparatus, characterized in that in the film conveying apparatus, which is drawably mounted onto a main frame of an image-forming apparatus, and conveys a photosensitive film into the main frame of the image-forming apparatus, the film containing means for containing said photosensitive film in it;

a conveying means, which conveys the films stacked on the film containing means one by one from uppermost one, and which is movable between at least two positions of a film conveying position when the film is conveyed into the main frame of the image-forming apparatus and a film supplying position when the films are supplied onto the film stacking means;

a first shading means that contains both the film containing means and the conveying means, and that has a conveyance opening from which the photosensitive film is conveyed out by the conveying means so as to maintain a light-shading state for both the film containing means and the conveying means when the conveying means parks at said film conveying position;

a second shading means, being movable relative to the first shading means, for opening and closing the conveyance opening;

are provided integrally and drawably from the main frame of the image-forming apparatus and a shading-piece opening/closing means for opening/closing the second shading means is provided.

According to the invention mentioned above, since shading-plate opening/closing means opens and closes a second shading means, when a film sheet is jammed for example, it is possible to close the second shading means by the shading piece opening/closing means, and during the jam processing in the image recording apparatus mainframe, the operation can be carried out without exposing to light the film sheets in the film containing means.

Further, even in the case where a conveying means of a roller type which has a possibility of jamming of a film sheet higher than a conveying means of a suction-board type, because the conveying means of a roller type can be taken out from the image recording apparatus mainframe together with the first shading means and the second shading means as a united body, the number of film sheets to be made useless by the jam processing can be suppressed.

Further, in the case where a film sheet is jammed on the way from the conveying-out opening to the image recording apparatus mainframe, when the first shading means is drawn out from the image recording mainframe, the second shading means grips the jammed film sheet while closing the conveying-out opening. That is, the drawing-out of the first shading means makes it possible to take out the jammed film sheet together. Then, by taking out the film sheet gripped by the second shading means, the jam processing can be easily carried out without exposing to light the film sheets contained in the film sheet containing portion.

Still further, since the conveying means is movable between at least two positions, at the time of supplying film sheets, it is possible to move the conveying means to the film supplying position, that is, to a position not to hinder the supply of film sheets, which makes it possible to carry out the supply of film sheets easily.

(8) The film conveying apparatus, described in item 7, characterized in that a shutter means for shading an end portion of a barrier sack to be opened, when the barrier sack, in which the plurality of photosensitive films are packed, is stored in the film containing means; and a shutter driving means for driving the shutter means; are provided, and the shutter driving means drives the shutter means so as to shade the end portion of the barrier sack while the conveying means moves from the film supplying position to the film conveying position.

According to the invention mentioned above, since the shutter driving means drives the shutter means so as to shade the end portion of the barrier sack while the conveying means moves from the film supplying position to the film conveying position, after the supply of film sheets until the start of carrying-in of a film sheet, that is, until the stripping of the barrier sack from the film sheets, the shutter means can shade the one end portion of the barrier sack unsealed. In other words, in the film conveying apparatus loaded with film sheets covered by the barrier sack, while the shading of film sheets before being carried in is secured, the same effect as the invention set forth in item 6 can be obtained at the time of jam processing.

(9) The film conveying apparatus, described in item 6 or item 8, characterized in that when the second shading member is closed, the shading-piece opening/closing means makes it possible to draw the first shading means from the main frame of the image-forming apparatus.

According to the invention mentioned above, since the shading-piece opening/closing means makes it possible to draw the first shading means from the main frame of the image-forming apparatus when the second shading member is closed, in case that the first shading means is drawn out from the image recording apparatus mainframe, it is practiced to close the second shading means, and the shading of film sheets in the film containing means at the time of drawing out can be kept, which makes it possible to prevent fogging of the film.

(10) The film conveying apparatus, described in anyone of items 7–9, characterized in that the shading-piece opening/closing means opens the second shading means after the conveying means moves to the film conveying position.

According to the invention mentioned above, since the shading-piece opening/closing means opens the second shading means after the conveying means moves to the film conveying position, when the conveyance of film is started, it is possible that the second shading means is made to come to the opening position, to retract from the conveyance path of film sheets. Accordingly, it is possible to prevent that the second shading means damages a film sheet during conveyance.

(11) The film conveying apparatus, described in anyone of items 7–9, characterized in that, when the shading-piece opening/closing means closes the second shading means, the second shading means is driven by an urging force for moving the second shading member so as to close the second shading means.

According to the invention mentioned above, since the second shading means is driven by an urging force for moving the second shading member so as to close the second shading means when the shading-piece opening/closing means closes the second shading means, even in the case where the second shading means is brought to the closing position, an urging force always acts so as to maintain the closing position. That is, it is possible to prevent that the film sheets in the film conveying apparatus is exposed to light at the time of jam processing.

BRIEF DESCRIPTION OF THE DRAWINGS

Other objects and advantages of the present invention will become apparent upon reading the following detailed description and upon reference to the drawings in which.

DETATAILED DESCRIPTION OF THE PREFERRED EMBODIMENT

In the following, the embodiment of this invention will be explained with reference to the drawings of FIG. 1 to FIG. 4.

Figure 1:
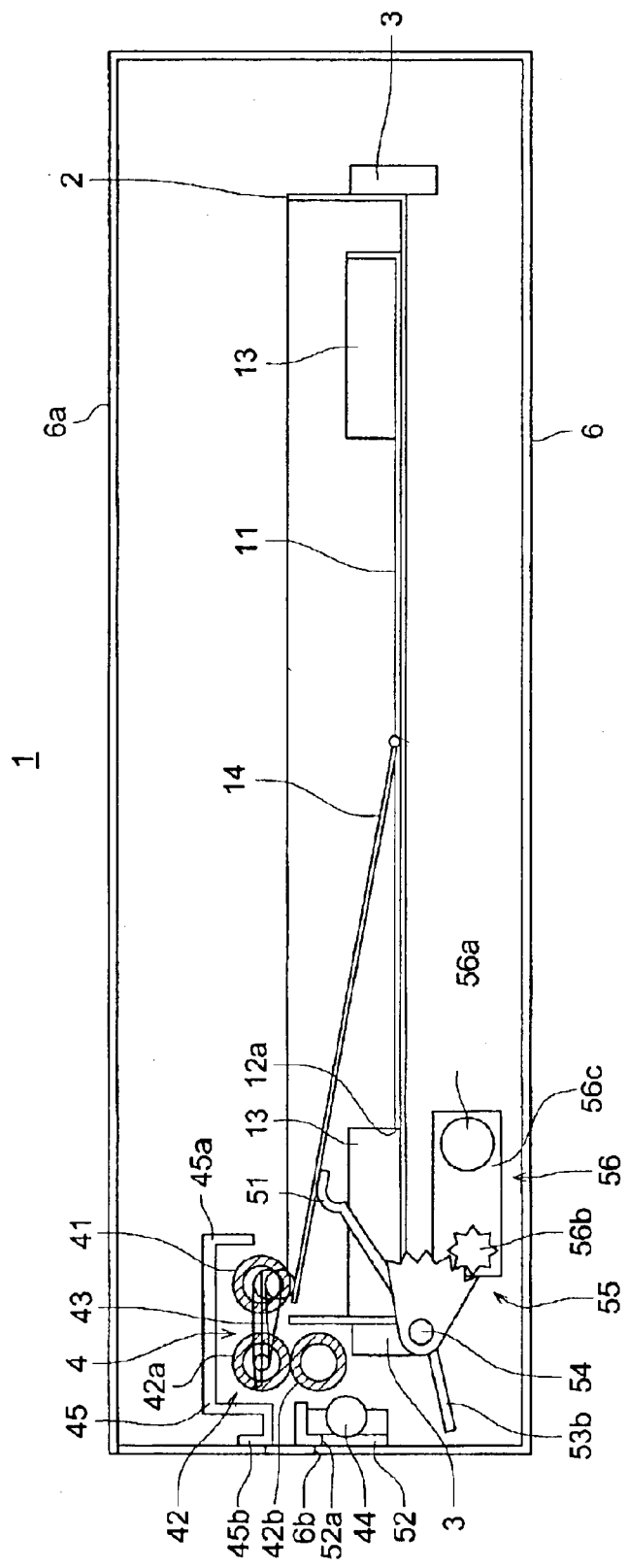
FIG. 1 is a side cross-sectional view of a film conveying apparatus embodied in the present invention.

A film conveying apparatus of the embodiment of this invention shown in FIG. 1 is an apparatus for carrying film sheets into an image recording apparatus (a laser imager for example) for recording the information of an image for medical use taken by a CT apparatus or an MRI apparatus, and is mounted in the image recording apparatus mainframe to be capable of being drawn out. Further, the film conveying apparatus is a film cartridge equipped with a conveying means for carrying film sheets.

Besides, film sheets are packed by a barrier sack 10 (refer to FIG. 2) in order not to be exposed to light before they are loaded in the film conveying apparatus 1. In the barrier sack 10, there is provided a film tray 11 for keeping a plurality of film sheets in the state of being stacked; the film tray 11, as shown in FIG. 3, is equipped with an H-shaped bottom portion 12 having notches 12a, wall portions 13 for regulating the movement of film sheets at the four corners of the bottom portion 12, and a lifting plate 14 supported by a shaft rotatably for lifting an end portion of film sheets at the time of sheet conveyance.

In addition, as regards the barrier sack 10, its material is not specifically limited so long as the material has a shading property, flexibility, and a mechanical strength to a certain degree; for example, it can be cited one composed of a thin film having a laminate structure of a PET film and an aluminum foil.

As explained in the above, film sheets are supplied to the film conveying apparatus 1 with the shading kept enough by the barrier sack 10. Further, at the time of conveyance, film sheets cannot be conveyed out unless they are stripped of the barrier sack 10, and the procedure of stripping the barrier sack 10 will be explained later.

Figure 4:
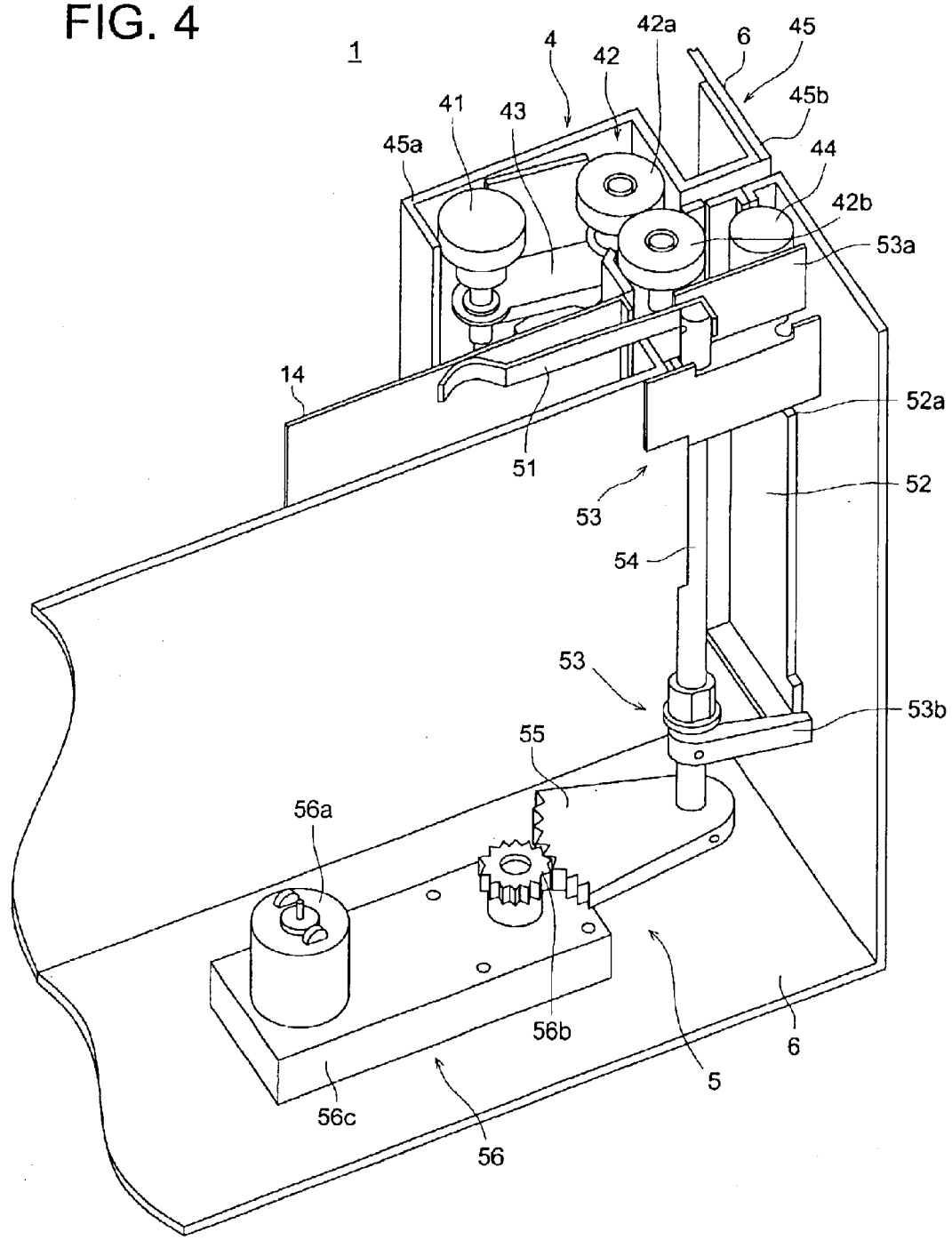
FIG. 4 is a perspective view of the internal structure of the film conveying apparatus shown in FIG. 1 as seen from the bottom side.

As shown in FIG. 1 and FIG. 4, the film conveying apparatus 1 is equipped with a cassette tray (film containing means) 2 for containing photosensitive film sheets together with the film tray 11 (in FIG. 4, only the lifting plate 14 of the film tray 11 is shown) inclusively, a film carrying portion 4 for carrying film sheets in the cassette tray 2 to the image recording apparatus mainframe, a guide portion 5 for guiding a film sheet to the film carrying portion 4, a shading case (a first shading means) 6 for shading and housing these portions having a conveyance opening 6b for conveying out a film sheet, and a lock means (the drawing omitted) for fixing the shading case 6 to the image recording apparatus mainframe.

To this film conveying apparatus 1, a slide rail 3, which is provided in the image recording apparatus mainframe, is attached, and by this slide rail 3, the film conveying apparatus 1 is held by the image recording apparatus mainframe to be capable of being drawn out. In addition, it is possible to dismount the film conveying apparatus 1 from the slide rail 3.

Further, the film conveying apparatus 1 is electrically connected to a control section provided in the image recording apparatus mainframe, and this control section controls every part of the apparatus. To this control section, a sensor for detecting the state of the film conveying apparatus 1 is connected, and on the basis of the result of detection by the sensor, the control section controls every part of the film conveying apparatus 1.

As regards the state of the film conveying apparatus 1, the sensor detects at least two states, namely, the state where a film sheet can be carried in the image recording apparatus mainframe, and the state where film sheets can be supplied into the film conveying apparatus 1. To state it concretely, for the state where a film sheet can be carried in the image recording apparatus mainframe, it can be cited the state where the film conveying apparatus 1 is forced to be in the image recording apparatus 1 to be loaded, and for the state where film sheets can be supplied into the film conveying apparatus 1, it can be cited the state where the film conveying apparatus 1 is drawn out of the image recording apparatus mainframe.

In addition, it is also appropriate to make the structure such one that the film conveying apparatus 1 itself is equipped with a control section, and practices control of every part independently in the image carrying apparatus 1.

In the cassette tray 2, there is provided a barrier sack unsealing portion 21 (FIG. 2) for keeping the shading property of the portion of the barrier sack 10 to be unsealed when an end portion of the barrier sack 10 is cut off for unsealing after it is loaded.

Figure 2:
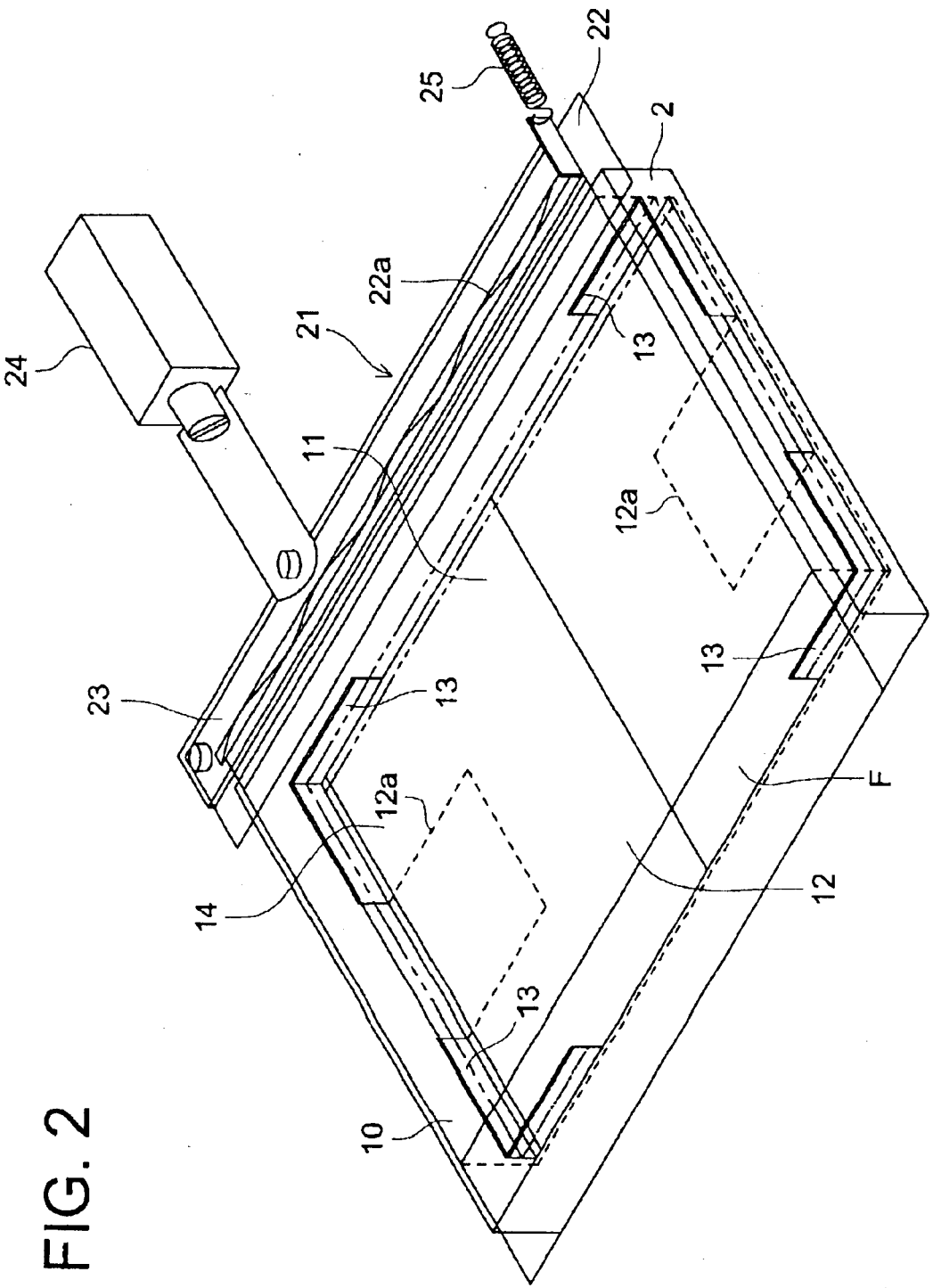
FIG. 2 is a perspective view showing a cassette tray provided in the film conveying apparatus shown in FIG. 1.
Figure 3:
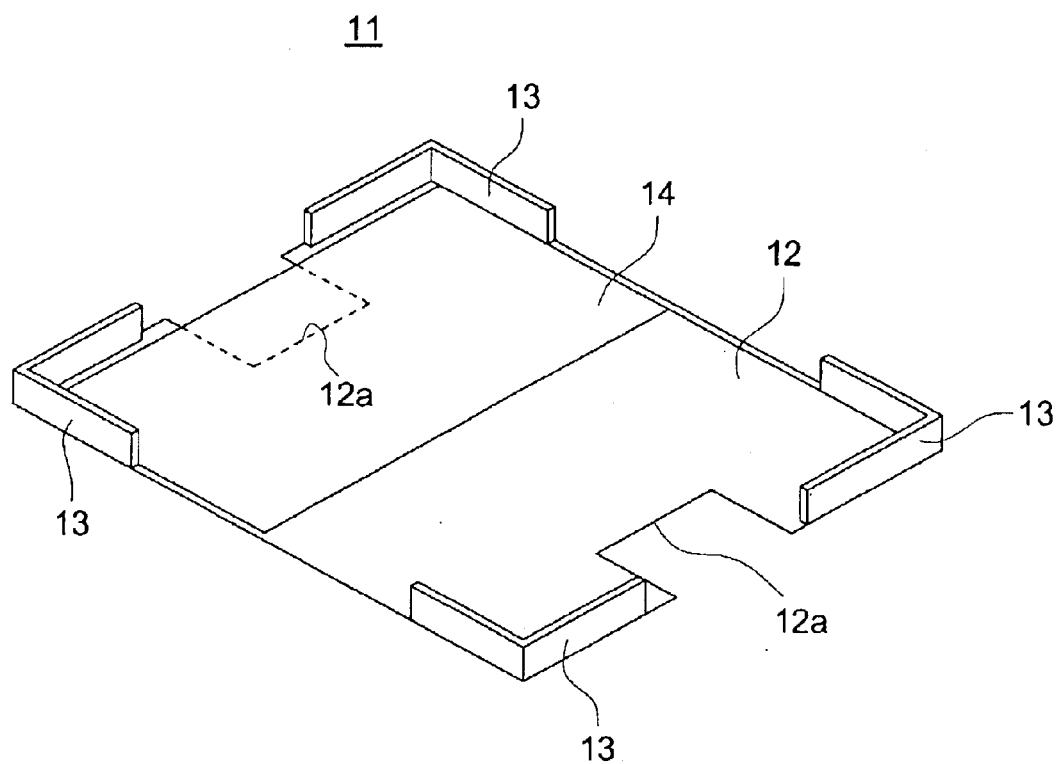
FIG. 3 is a perspective view showing a film tray provided in the film conveying apparatus shown in FIG. 1.

As shown in FIG. 2, the barrier sack unsealing portion 21 is equipped with a cut base table 22 for holding one end portion of the barrier sack 10 penetrating through the slit 22a, a shading plate (a shutter means) 23 supported rotatably around a shaft 23a by the cut base table 22 to shade the one end portion of the barrier sack 10 to be unsealed, a solenoid (a shutter driving means) 24 for driving the shading plate 23 to rotate, and an urging spring 25 for giving an urging force to the shading plate 23. Further, the solenoid 24 is electrically connected to the control section, and its operation is controlled.

In the film carrying portion 4, as shown in FIG. 1 and FIG. 4, there are provided a conveyance roller 41 for conveying a stack of plural film sheets contained in the cassette tray 2 successively from the top one, a film separation portion 42 for feeding the film sheets conveyed out by the conveyance roller 41 to the image recording apparatus mainframe one by one, a roller supporting portion 43 for supporting the conveyance roller 41 rotatably, a conveyance drive portion 44 for driving the conveyance roller 41, the film separation portion 42, and the roller supporting portion 43, and a cover member 45 for covering these portions.

The film separation portion 42 comprises a drive roller 42a for giving a driving force to a film sheet conveyed from the conveyance roller 41 toward the direction of conveyance and a separation roller 42b for separating film sheets conveyed out by the conveyance roller 41 one from another, and the separation roller 42b is disposed under the drive roller 42a.

Then, if the conveyance roller 41 conveyed out a plurality of film sheets, the drive roller 42a gives a driving force to the topmost film sheet toward the conveyance direction, while the separation roller 42b conveys the film sheets except the sheet given the driving force toward the direction reverse to the conveyance direction. That is, film sheets except the topmost one are made to come back to the cassette tray 2.

The roller support portion 43, at the time of sheet conveyance, moves the conveyance roller 41 downward to make it become in contact with the film sheets in the cassette tray 2, to bring the conveyance roller into the state where it is capable of carrying film sheets in the image recording apparatus mainframe. On the other hand, at the time of supply of film sheets, the roller support portion 43 moves the conveyance roller 41 upward so as to make the supply of film sheets be carried out easily.

That is, the roller support portion 43 supports the conveyance roller 41 movably at least between the two positions, the film carrying-in position for carrying film sheets in the image recording apparatus mainframe and the film supplying position for supplying film sheets to the cassette tray 2.

As described in the above, the conveyance roller 41, the film sheet separation portion 42, and the roller support portion 43 have a function of conveying means for conveying a stack of plural film sheets contained in the cassette tray 2 successively from the topmost one, and the conveyance roller 41 is made capable of being moved between at least the two positions, namely, the film carrying-in position and the film supplying position.

The conveyance drive portion 44 is electrically connected to the control section, and on the basis of the control by the control section, it operates in such a way as to make it possible that the conveyance roller 41, the film separation portion 42, and the roller support portion 43 convey film sheets stably. Further, the conveyance drive portion 44 is controlled-in the following way in relation to the result of detection by the sensor.

In the case where the sensor has detected the state where film sheets can be carried into the image recording apparatus mainframe, the control section controls the conveyance drive portion 44 to move the conveyance roller 41 to the film carrying-in position, to make the roller support portion 43 operate.

On the other hand, in the case where the sensor has detected the state where film sheets can be supplied in the film conveying apparatus 1, the control section controls the conveyance drive portion 44 to move the conveyance roller 41 to the film supplying position, to make the roller support portion 43 operate.

The cover member 45 is provided with a cover portion main body 45a having a U-shaped cross-section for covering the film sheet conveyance portion 4, and an extension portion 45b which extends from one end of the cover portion main body 45a to have an L-shaped cross-section to cover the upside of the film sheet conveyance path and is in contact with the shading case 6.

The guide portion 5 is equipped with a lift piece 51 for moving the lifting plate 14 of the film tray 11 up and down, a shading piece (a second shading means) 52 for opening and closing the conveying-out opening 6b of the shading case 6, an open-close switching portion 53 for switching the opened/closed state through moving the shading piece 52 up and down, a shaft 54 for supporting the lift piece 51 and the open-close switching portion 53, a fan-shaped gear 55 for rotating the shaft 54, and a gear driving portion 56 for driving the gear 55.

The lift piece 51 is attached to the shaft 54 with its one end portion folded; further, the other end portion of the lift piece 51 is curved, and this curved portion is brought into contact with the lifting plate 14 of the film tray 11 to make it move up and down with the rotation of the shaft 54.

The shading piece 52 opens and closes the conveying-out opening 6b from the inside of the shading case 6 through moving up and down relatively to the shading case 6. When the opening is in the closed state, the shading piece 52 is in contact with the bottom surface of the extension portion 45b of the cover member 45. That is, by closing the conveyance path of film sheets, it is prevented that film sheets inside the shading case 6 are exposed to light.

Further, in the shading piece 52, there is provided a notch 52a for receiving the conveyance drive portion 44. Owing to this, even if the shading piece moves up and down, it is prevented that it obstructs the operation of the conveyance drive portion 44.

The open-close switching portion 53 is equipped with a first switching portion 53a which is in contact with the portion where the notch 52a of the shading piece 52 is provided, and a second switching portion which is in contact with the lower end of the shading piece 52.

The shaft 54 fixes the lift piece 51 and the open-close switching portion 53 in an arrangement such that the open-close switching portion 53 is out of contact with the shading piece 52 while the lift piece 51 is in contact with the lifting plate 14 of the film tray 11. That is, although the lift piece 51 and the open-close switching portion 53 operate with the rotation of the shaft 54, the up-and-down motion of the lifting plate 14 and the up-and-down motion of the shading piece 52 are done in a separate way.

The gear driving portion 56 is equipped with a drive motor 56a, a gear 56b engaging with the gear 55, and a gear box 56c for transmitting the rotation of the drive motor 56a to the gear 56b.

The drive motor 56a is electrically connected to the control section, and its rotation is controlled on the basis of the result of the detection by the sensor. In the case where the sensor has detected the state where film sheets can be carried into the image recording apparatus, the control section rotates the drive motor 56a to rotate the shaft 54 through the gear 56b and the gear 55 so as to lift the lifting plate 14 of the film tray 11. Besides, before the lifting plate 14 of the film tray 11 is lifted, the open-close switching portion 53 operates in such a manner as to move the shading piece 52 downward with the rotation of the shaft 54, and the conveying-out opening 6b is brought in the opened state to actualize a state where the conveyance path of film sheets is secured.

Further, the control section controls the drive motor 56a in such a way that the uppermost film sheet is always in contact with the conveyance roller 41 even if the number of film sheets in the cassette tray 2 decreases accompanied by the conveying-out of film sheets, and moves up and down the lifting plate 14 of the film tray 11 by means of the lift piece 51.

On the other hand, in the case where the sensor has detected the state where film sheets can be supplied into the film conveying apparatus 1, in order that the open-close switching portion 53 may lift the shading piece 52 to bring the conveying-out opening 6b into the closed state, the control section rotates the drive motor 56a to rotate the shaft 54 through the gear 56 and the gear 55.

Further, even in the case where a film sheet is jammed in the film sheet conveyance portion in the image recording apparatus mainframe or in the film sheet conveyance portion 4 in the film conveying apparatus 1 to make the related portions not operate normally, in order that the open-close switching portion 53 may lift the shading piece 52 to bring the conveying-out opening 6b into the closed state, the control section rotates the drive motor 56a to rotate the shaft 54 through the gear 56 and the gear 55. That is, it is prevented that light enters from the conveying-out opening 6b of the shading case 6 to cause the film sheets in the film conveying apparatus 1 to be exposed to light, when a jam processing is carried out.

In this way, the open-close switching portion 53, the shaft 54, the gear 55, and the gear driving portion 56 function as a shading piece opening/closing means for opening/closing the shading piece 52.

The shading case 6 is equipped with a supply cover 6a, serving as a cover member for supplying film sheets to the cassette tray 2, and the conveying-out opening 6b for conveying out a film sheet having been conveyed by the film sheet separating portion 42.

The supply cover 6a is capable of opening and closing an installation opening, which is closed while a film sheet is conveyed out to secure the shading inside the shading case 6. Further, when film sheets are supplied, the supply cover 6a is opened, and the cassette tray 2 is loaded with film sheets packed in the barrier sack 10, through the installation opening.

The lock means is connected to the control section to be controlled. In the case where the shading piece 52 is in the closing position, the control section makes the lock means operate to release the fixing of the shading case 6 to the image recording apparatus mainframe. That is, in the state where film sheets can be supplied into the film conveying apparatus 1, or in the state where a film sheet is jammed in the film conveyance portion in the image recording apparatus mainframe or in the film conveyance portion 4 in the film conveying apparatus 1, it is possible to draw out the film conveying apparatus 1 from the image recording apparatus mainframe; however, in the state where a film sheet can be carried into the image recording apparatus mainframe, the shading case 6 is fixed to the image recording apparatus mainframe to prohibit that the film conveying apparatus is drawn out from the image recording apparatus mainframe.

As explained up to now, this film conveying apparatus 1 is equipped with the cassette tray 2, the conveying means (the conveyance roller 41, the film sheet separation portion 42, and the roller support portion 43) shading case 6, and the shading piece 52 to be able to drawn out as a united body.

Now, the operations of the pertinent portions from the film supply up to the jam processing will be explained.

When film sheets have run out in the film conveying apparatus 1, an operator draws out the film conveying apparatus 1 from the image recording apparatus mainframe. At this time, because the sensor detects the state where film sheets can be supplied into the film conveying apparatus 1, the conveyance roller 41, the film separation portion 42, and the roller support portion 43 is made to move to the film supplying position, which prevents these portions becoming the hindrance to make it possible to carry out the supply of film sheets easily. After that, the supply cover 6a of the shading case 6 is opened, and film sheets F (the portion expressed by the double dot and dash lines in the drawing) packed in the barrier sack 10 are stored in the cassette tray 2. Then, the operator makes one end portion of the barrier sack 10 penetrate through the slit 22a of the cut base table 22, and cuts off the end portion as it keeps the penetrating state, to unseal the barrier sack 10. At this time, in order not to expose the inside to light entering from the cut-off portion, the one end portion of the barrier sack 10 is covered by the shading plate 23 beforehand, and is pressed to the cut base table 22.

When completing the unsealing of the barrier sack 10, the operator closes the supply cover 6a in such a manner that the other end portion of the barrier sack 10 projects from the supply cover to the outside of the shading case 6. Owing to this, the inside of the shading case 6 is kept in the shading state. After closing the supply cover, the operator loads the image recording apparatus mainframe with the film conveying apparatus 1 through inserting it forcibly. At this time, in the case where the control section and the shading piece opening/closing portion 30 are provided in the image recording apparatus mainframe, the pertinent portions to be controlled by the control section come to be electrically connected to the control section.

When the film conveying apparatus 1 is loaded in the image recording apparatus mainframe, the other end portion of the barrier sack 10 projects from between the image recording apparatus mainframe and the film conveying apparatus 1, while the sensor detects the state where film sheets can be carried into the image recording apparatus mainframe. By this detection, the conveyance roller 41, the film sheet separation portion 42, and the roller support portion 43 move to the film carrying-in position. After this move, the solenoid 24 rotates the shading plate 23 to release the one end portion of the barrier sack 10.

That is, the solenoid 24 drives the shading plate in such a way that the shading plate 23 shades the unsealed one end portion of the barrier sack while the conveyance roller 41, the film sheet separation portion 42, and the roller support portion 43 are moving from the film supplying position to the film carrying-in position.

Then, the operator pulls the other end portion of the barrier sack 10 projecting from between the image recording apparatus mainframe and the film conveying apparatus 1, and strips the film F of the barrier sack 10, to complete the supply of film sheets F.

When the supply of film sheets is completed and image recording is started, the film conveying apparatus 1 carries film sheets F in the image recording apparatus mainframe one by one.

If a film sheet F is jammed during the film conveyance, the shading piece 52 closes the conveying-out opening 6b. At this time, if a film sheet is present at the conveying-out opening 6b, this film sheet F is gripped by the shading piece 52 and the shading case 6, and it occurs a state where one end portion of the film F protrudes out of the conveying-out opening 6b.

When the conveying-out opening is closed in this way, the operator draws out the film conveying apparatus 1 from the image recording apparatus mainframe. Then, he takes out the film sheet F protruding out of the conveying-out opening 6b to carry out the jam processing. In addition, even when the film F is taken out, because the shading piece 52 closes the conveying-out opening, the film sheets in the shading case 6 are not exposed to light.

Further, because the film sheets F remaining in the shading case 6 have no creases, scratches, or the like, when the film conveying apparatus 1 is again mounted to the image recording apparatus mainframe, it is possible to practice the conveyance of a film sheet F.

Further, in the case where a film sheet F is jammed in the film carrying portion 4 of the shading case 6, an operator carries out a jam processing through opening the supply cover 6a. In this case, even though the film sheets F in the shading case 6 are exposed to light, the jam processing can be carried out at the outside of the image recording apparatus mainframe.

As explained up to now, by the use of the film conveying apparatus 1 of this embodiment, because the shading piece opening/closing means (the open-close switching portion 53, the shaft 54, the gear 55, and the gear drive portion 56) opens and closes shading piece 52, for example, when a film F is jammed, it is possible to bring the shading piece 52 to the closing position by the shading piece opening/closing means, and the operation can be carried out without exposing the film sheets F in the cassette tray 2 during the jam processing in the image recording apparatus mainframe.

Further, in the case where a film sheet F is jammed on the way from the conveying-out opening 6b to the image recording apparatus mainframe, when the shading case 6 is drawn out from the image recording apparatus mainframe, the shading piece 52 grips the film sheet F jammed while closing the conveying-out opening 6b. That is, the drawing-out of the shading case 6 makes it possible to take out the jammed film sheet F together. Further, when the film sheet gripped by the shading piece 52 is taken out, the jam processing can be easily carried out without exposing to light film sheets stored in the cassette tray 2.

Further, because it becomes possible to draw out the shading case 6 from the image recording apparatus mainframe when the shading piece opening/closing means closes the shading piece 52, at the time the shading case 6 is drawn out from the image recording apparatus mainframe, the shading piece 52 is made to be at the closing position, shading for the film sheets F in the cassette tray 2 during drawing out can be secured, which makes it possible to prevent the fogging of the film sheets F.

Further, because the shading piece opening/closing means brings the shading piece 52 to the opening position after the conveying means (the conveyance roller 41, the film sheet separation portion 42, and the roller support portion 43) moves to the film carrying-in position, it is possible to retract the shading piece 52 from on the conveyance path of a film sheet F. Accordingly, it is possible to prevent that the shading piece. 52 damages the film sheet F.

In addition, the present invention is not limited to the above-mentioned embodiment, and it is a matter of course that the invention can be suitably altered. For example, in this embodiment, it is shown as an example a structure such that the opening/closing position of the shading piece is changed by the control of the rotation of the drive motor 56a; however, in addition to this, for example, it is also appropriate a structure such that the shading piece 52 is operated by an urging force acting to bring this shading piece 52 to the closing position when it is required. With such a structure, even in the case where the shading piece is brought to the closing position, an urging force always acts in such a manner as to always maintain the closing position, and it can be prevented that the film sheets F in the film conveying apparatus 1 is exposed to light at the time of jam processing.

As for the structure to give this urging force, for example, it can be cited a structure using the weight of the gear 55 itself. Supposing that the rotation of the drive motor 56a is in the free state when the shading piece is at the closing position, both the rotation of the gear 56b and the rotary movement of the gear 55 are free. The gear 55 makes a rotary movement by its own weight, to rotate the shaft 54 so as to make the open-close switching portion 53 lift the shading piece 52. In the case of such a structure, it is desirable to provide a regulating member for regulating the amount of the rotary movement of the gear 55 in order that the engagement between the gear 55 and the gear 56b may not be released with the rotary movement of the gear 55 by its own weight.

Further, when the shading 52 is to be brought to the opening position, it is appropriate to drive the motor 56a in the same way as the present embodiment.

Further, as an example other than the urging force due to the weight of the gear 55 itself, it is also appropriate to use an urging force by an elastic body such as a spring.

Incidentally, in the embodiment described in the foregoing, the film conveying apparatus, of a type in which the films are loaded onto the film cartridge by manually drawing the barrier sack toward the outside of the film cartridge after putting the barrier sack containing the stack of plural films on the film cartridge, has been detailed. However, it is needless to say that the present invention can be also applied for a film conveying apparatus of a type in which the films are loaded onto the film cartridge by rolling the barrier sack onto a reel in the film cartridge after putting the barrier sack containing the stack of plural films on the film cartridge, as well.

As described in the foregoing, according to the present invention, the following effects can be attained.

(1) When a film sheet is jammed for example, it is possible to close the second shading means by the shading piece opening/closing means, and during the jam processing in the image recording apparatus mainframe, the operation can be carried out without exposing to light the film sheets in the film containing means.

Further, even in the case where a conveying means of a roller type which has a possibility of jamming of a film sheet higher than a conveying means of a suction-board type, because the conveying means of a roller type can be taken out from the image recording apparatus mainframe together with the first shading means and the second shading means as a united body, the number of film sheets to be made useless by the jam processing can be suppressed.

(2) In the case where a film sheet is jammed on the way from the conveying-out opening to the image recording apparatus mainframe, when the first shading means is drawn out from the image recording mainframe, the second shading means grips the jammed film sheet while closing the conveying-out opening. That is, the drawing-out of the first shading means makes it possible to take out the jammed film sheet together. Then, by taking out the film sheet gripped by the second shading means, the jam processing can be easily carried out without exposing to light the film sheets contained in the film sheet containing portion.

Further, at the time of supplying film sheets, it is possible to move the conveying means to the film supplying position, that is, to a position not to hinder the supply of film sheets, which makes it possible to carry out the supply of film sheets easily.

(3) After the supply of film sheets until the start of carrying-in of a film sheet, that is, until the stripping of the barrier sack from the film sheets, the shutter means can shade the one end portion of the barrier sack unsealed. In other words, in the film conveying apparatus loaded with film sheets covered by the barrier sack, while the shading of film sheets before being carried in is secured, the same effect as the invention set forth in the paragraph (1) can be obtained at the time of jam processing.

When the first shading means is drawn out from the image recording apparatus mainframe, it is practiced to close the second shading means, and the shading of film sheets in the film containing means at the time of drawing out can be kept, which makes it possible to prevent fogging of the film.

(4) when the conveyance of film is started, it is possible that the second shading means is made to come to the opening position, to retract from the conveyance path of film sheets. Accordingly, it is possible to prevent that the second shading means damages a film sheet during conveyance.

(5) Even in the case where the second shading means is brought to the closing position, an urging force always acts so as to maintain the closing position. That is, it is possible to prevent that the film sheets in the film conveying apparatus is exposed to light at the time of jam processing.

Disclosed embodiment can be varied by a skilled person without departing from the spirit and scope of the invention.

What is claimed is:

1. A film feeding unit, which is drawably equipped in an image-forming apparatus, for feeding a photosensitive film into said image-forming apparatus, said film feeding unit comprising:

a film stacking section to stack a plurality of photosensitive films on it;

a conveying device to convey said plurality of photosensitive films, stacked on said film stacking section, one by one from uppermost one, said conveying device being movable between at least two positions of a film conveying position at which said photosensitive film is conveyed into said image-forming apparatus and a film supplying position at which said plurality of photosensitive films are supplied onto said film stacking section;

a first shading member that encloses both said film stacking section and said conveying device, and that has a conveyance opening from which said photosensitive film is conveyed into said image-forming apparatus by said conveying device while maintaining a light-shading state for both said film stacking section and said conveying device when said conveying device parks at said film conveying position;

a second shading member, being movable relative to said first shading member, to open and close said conveyance opening; and a shading-member moving device to move said second shading member so as to open and close said conveyance opening.

2. The film feeding unit of claim 1, further comprising:

a shutter member to shade an end-seal portion of a barrier sack, in which said plurality of photosensitive films are packed, when said barrier sack is stored in said film stacking section to break said end-seal portion of said barrier sack; and a shutter-member driving device to drive said shutter member so as to shade said end-seal portion of said barrier sack while said conveying device moves from said film supplying position to said film conveying position.

3. The film feeding unit of claim 1, wherein said film feeding unit is drawable from said image-forming apparatus, when said shading-member moving device moves said second shading member so as to close said conveyance opening.

4. The film feeding unit of claim 1, wherein said shading-member moving device moves said second shading member so as to open said conveyance opening, after said conveying device moves to said film conveying position.

5. The film feeding unit of claim 1, wherein, when said shading-member moving device moves said second shading member so as to close said conveyance opening, said second shading member is driven by an urging force for moving said second shading member into a closing state.

6. The film feeding unit of claim 1, wherein said first shading member includes a supply cover, being a part of said first shading member and manually movable relative to another part of said first shading member to open and close an installation opening; and wherein a barrier sack, in which said plurality of photosensitive films are packed, is installed on said film stacking section through said installation opening by manually opening said supply cover, when said film feeding unit is drawn from said image-forming apparatus.

* * * * *